United States Patent
Park et al.

(10) Patent No.: US 9,651,983 B2
(45) Date of Patent: May 16, 2017

(54) CLOCK GENERATION DEVICE AND SEMICONDUCTOR DEVICE INCLUDING THE SAME

(71) Applicant: SK hynix Inc., Icheon-si Gyenoggi-do (KR)

(72) Inventors: Min Su Park, Seoul (KR); Jae Il Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 14/930,749

(22) Filed: Nov. 3, 2015

(65) Prior Publication Data

US 2017/0017258 A1    Jan. 19, 2017

(30) Foreign Application Priority Data

Jul. 16, 2015    (KR) .................. 10-2015-0101098

(51) Int. Cl.
*G06F 1/04*    (2006.01)

(52) U.S. Cl.
CPC ..................... *G06F 1/04* (2013.01)

(58) Field of Classification Search
None
See application file for complete search history.

(56) References Cited

U.S. PATENT DOCUMENTS

| | | | |
|---|---|---|---|
| 4,931,986 A * | 6/1990 | Daniel ................. | G06F 1/10 327/261 |
| 6,750,692 B2 | 6/2004 | Jang | |
| 7,266,743 B2 * | 9/2007 | Athavale ........ | G01R 31/318594 714/726 |
| 7,304,523 B2 * | 12/2007 | Yen .................. | H03L 7/113 327/160 |
| 8,183,905 B2 * | 5/2012 | Chang ................ | H03B 5/368 327/291 |
| 8,610,479 B2 * | 12/2013 | Lee ................... | H03L 7/22 327/113 |
| 8,841,960 B2 | 9/2014 | Cho et al. | |
| 8,918,667 B2 * | 12/2014 | Ware .................. | G11C 7/04 710/61 |
| 9,244,485 B1 * | 1/2016 | Koh .................... | G06F 1/08 |
| 9,344,065 B2 * | 5/2016 | Ying .................. | H03K 3/013 |
| 9,495,231 B2 * | 11/2016 | Gilda ................. | G06F 1/12 |

* cited by examiner

*Primary Examiner* — Lincoln Donovan
*Assistant Examiner* — Khareem E Almo
(74) *Attorney, Agent, or Firm* — William Park & Associates Ltd.

(57) ABSTRACT

A clock generation device and a semiconductor device including the same are disclosed, which may tune an internal clock to a desired frequency. The clock generation device may include an oscillator configured to tune an oscillation signal in response to a tuning signal, and adjust a period of an internal clock. The clock generation device may include a counter configured to count the internal clock in response to a count enable signal, and output a count signal. The clock generation device may include a comparator configured to compare the count signal with a test count signal including a target count number of the internal clock, and output the tuning signal.

26 Claims, 6 Drawing Sheets

CLOCK GENERATION DEVICE AND SEMICONDUCTOR DEVICE INCLUDING THE SAME

CROSS-REFERENCE TO RELATED APPLICATION

This application claims priority based upon Korean patent application No. 10-2015-0101098, filed on Jul. 16, 2015, the disclosure of which is hereby incorporated in its entirety by reference herein.

BACKGROUND

1. Technical Field

Embodiments of the present disclosure generally relate to a clock generation device and a semiconductor device including the same, and more particularly to a technology for tuning an internal clock to a desired frequency.

2. Related Art

Recently, with the increasing development of higher-speed electronic systems each having a semiconductor memory device, a skew between an external clock signal applied to the semiconductor memory device and output data of the semiconductor memory device is of importance to correct the transmission of data.

Generally, the semiconductor memory device includes an internal clock signal generation circuit configured to generate an internal clock signal synchronized with the external clock signal to minimize a resulting skew.

The conventional internal clock signal generation circuit may include an oscillator configured to generate an internal clock. However, if an error occurs according to a change in process, voltage, and/or temperature (PVT), it is impossible to adjust the clock signal using a target frequency.

In order to test the memory device, stand-alone-machine based test devices have been widely used.

However, if a pad or similar means capable of directly accessing the memory in the same manner as in either a memory device associated with a microprocessor or an embedded memory device, it is impossible to test the memory devices using the stand-alone-machine based test device. In order to address this issue, the scheme for including a Built-In Self Test (BIST) circuit into the semiconductor device has recently been proposed.

However, if an error occurs in a period or cycle of the oscillator according to a change in PVT, it becomes difficult to perform testing that is correct in the BIST circuit, such that there is a higher probability of overkill. Therefore, a method for properly tuning an internal clock generated from the oscillator of the internal clock signal generation circuit to a target clock is of importance.

SUMMARY

In accordance with an embodiment, a clock generation device may be provided. The clock generation device may include an oscillator configured to tune an oscillation signal in response to a tuning signal, and adjust a period of an internal clock. The clock generation device may include a counter configured to count the internal clock in response to a count enable signal, and output a count signal. The clock generation device may include a comparator configured to compare the count signal with a test count signal including a target count number of the internal clock, and output the tuning signal.

In accordance with an embodiment, semiconductor device may be provided. The semiconductor device may include a clock generation device configured to generate an internal clock upon receiving an external clock, and adjust a period of the internal clock in response to a tuning signal. The semiconductor device may include a Built-In Self Test (BIST) unit configured to output a test signal in response to the internal clock. The semiconductor device may include and a core unit in which a test operation of internal data is performed in response to the test signal.

In accordance with an embodiment a clock generation device may be provided. The clock generation device may include an oscillator configured to tune an external clock signal in response to a tuning signal, and adjust a period of an internal clock signal based on the tuning signal. The clock generation device may include a comparator configured to compare the period of the internal clock with a target period to determine the period of the internal clock, and output the tuning signal to the oscillator.

In accordance with an embodiment a clock generation device may be provided. The clock generation device may include an oscillator configured to tune an external clock signal in response to a tuning signal, and adjust a period of an internal clock signal based on the tuning signal. The clock generation device may include a counter configured to count the internal clock, and output a count result. The clock generation unit may include a comparator configured to compare the count result with a target count number to determine the period of the internal clock, and output the tuning signal to the oscillator.

The counter controller includes: a logic gate configured to perform an AND operation among the oscillation signal, an inversion signal of the fixing signal, and the enable signal, and thus output the count enable signal.

The clock generation device further comprising: a counter configured to count a number of toggling times of the internal clock, and output a count signal indicating a count result, wherein the comparator compares the count result with a target count number for comparing the period of the internal clock with the target period to determine the period of the internal clock.

The clock generation device further comprising: a divider configured to divide an external clock into a plurality of division clock signals, and output the plurality of division clock signals; and a selection unit configured to select the external clock or any one of the division clock signals and output an oscillation signal indicating the selected result, wherein the oscillator is configured to tune the oscillation signal generated from the external clock signal in response to the tuning signal.

If the number of toggling times of the count signal is less than the target count number, then the oscillator increases a period of the internal clock, wherein, if the number of toggling times of the count signal is greater than the target count number, then the oscillator reduces a period of the internal clock, and wherein, if the number of toggling times of the count signal is equal to the target count number, then the oscillator fixes the period of the internal clock.

The tuning signal includes an increase signal for increasing a period of the internal clock, a decrease signal for reducing the period of the internal clock, and a fixing signal for fixing the period of the internal clock.

The clock generation device further comprising: a counter controller configured to activate the counter in response to the oscillation signal, a fixing signal, and an enable signal, wherein the oscillator is configured to tune the oscillation signal in response to the tuning signal when the enable signal is activated.

The clock generation device further comprising: an enable controller configured to output the enable signal in response to a start signal when the oscillation signal is activated.

A clock generation device comprising: an oscillator configured to tune an external clock signal in response to a tuning signal, and adjust a period of an internal clock signal based on the tuning signal; a counter configured to count the internal clock, and output a count result; and a comparator configured to compare the count result with a target count number to determine the period of the internal clock, and output the tuning signal to the oscillator.

DETAILED DESCRIPTION

Reference will now be made to embodiments of the present disclosure, examples of which are illustrated in the accompanying drawings. Wherever possible, the same reference numbers are used throughout the drawings to refer to the same or like portions. In the following description of the present disclosure, a detailed description of related known configurations or functions incorporated herein may be omitted for clarity of the subject matter of the present disclosure.

Various embodiments of the present disclosure may be directed to providing a clock generation device and a semiconductor device including the same that substantially obviate one or more problems due to limitations and disadvantages of the related art.

Various embodiments of the present disclosure may relate to a clock generation device and a semiconductor device including the same, which can properly tune a frequency of an internal clock to a target frequency.

Figure 1:
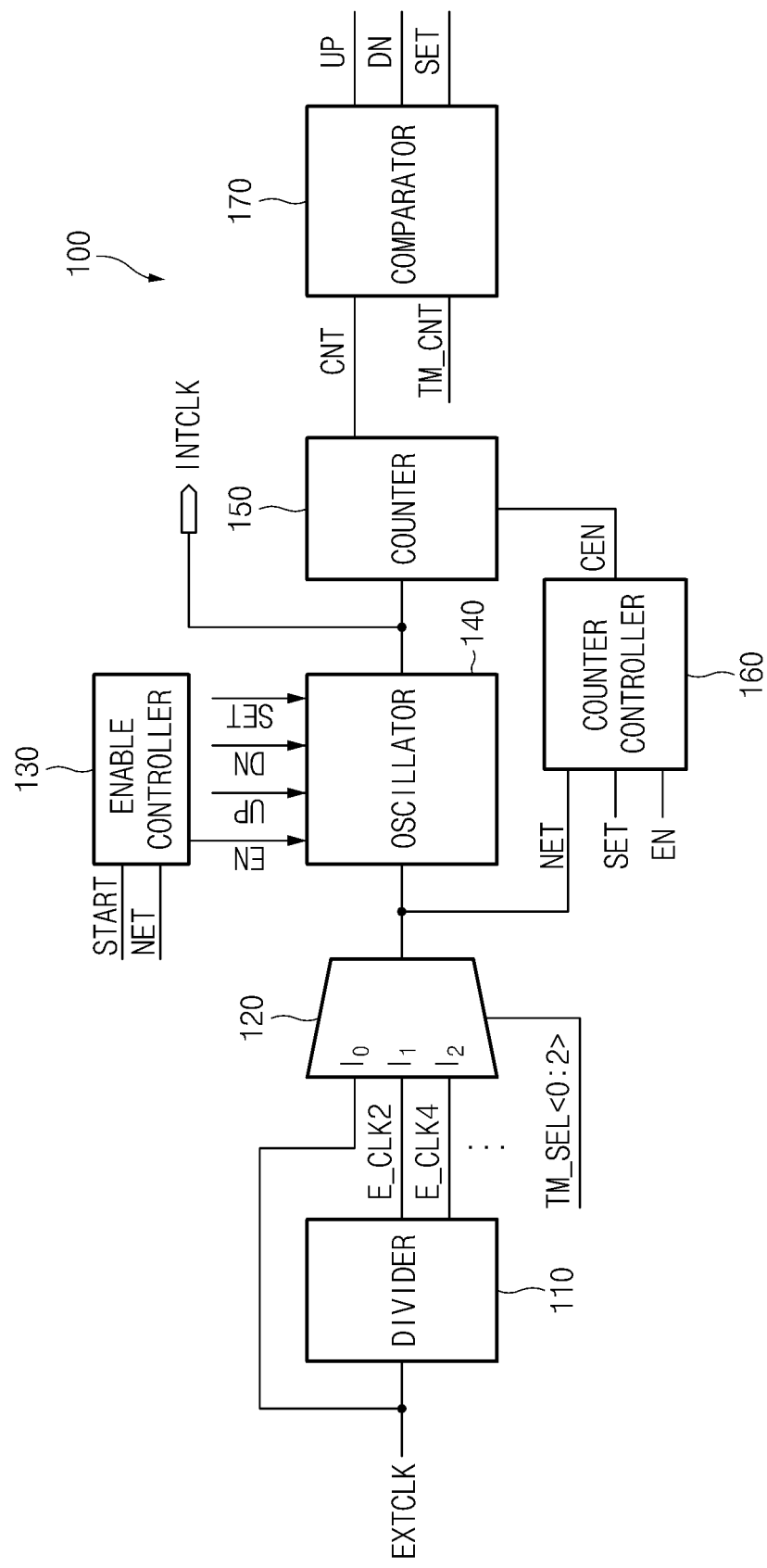
FIG. 1 is a block diagram illustrating a representation of an example of a clock generation device according to an embodiment.

FIG. 1 is a block diagram illustrating a representation of an example of a clock generation device 100 according to an embodiment.

Referring to FIG. 1, the clock generation device 100 according to the embodiment may include a divider 110, a selection unit 120, an enable controller 130, an oscillator 140, a counter 150, a counter controller 160, and a comparator 170.

In this example, the divider 110 may divide an external clock (EXTCLK) into a plurality of division clock signals (E_CLK2, E_CLK4) according to a predetermined ratio. For example, the division clock signal (E_CLK2) may be achieved by dividing the external clock (EXTCLK) into two division clock signals. The division clock signal (E_CLK4) may be achieved by dividing the external clock (EXTCLK) into four division clock signals.

The selection unit 120 may select the external clock (EXTCLK) or any one of the division clocks (E_CLK2, E_CLK4) in response to the selection signal TM_SEL<0:2>, and may output the selected result as an oscillation signal (NET). The enable controller 130 may output the enable signal (EN) for activating the oscillator 140 in response to the start signal (START) and the oscillation signal (NET).

The oscillator 140 may generate an internal clock (INTCLK) acting as a pulse signal toggled according to the oscillator signal (NET), the enable signal (EN), the increase signal (UP), the decrease signal (DN), and the fixing signal (SET).

In this example, the increase signal (UP), the decrease signal (DN), and the fixing signal (SET) generated from the comparator 170 are fed back from the comparator 170 to the oscillator 140, such that the oscillator 140 may tune the internal clock (INTCLK) to a desired period. The enable signal (EN), the increase signal (UP), the decrease signal (DN), or the fixing signal (SET) may be used as a tuning signal.

If the enable signal (EN) is activated, the oscillator 140 may perform tuning of the internal clock (INTCLK) in response to the increase signal (UP), the decrease signal (DN) or the fixing signal (SET) generated during activation of the oscillation signal (NET) in such a manner that the internal clock (INTCLK) is turned to a long period, a short period, or a fixed period according to any one of the signals (UP, DN, SET). As a result, the internal clock (INTCLK) can be tuned to a target period.

The counter 150 may count the number of toggling times of the internal clock (INTCLK) in response to a count enable signal (CEN) to output a count signal (CNT). That is, the counter 150 may indicate the count result using a signal of N bits, resulting in formation of the count signal (CNT). In an embodiment, N may represent a positive integer greater than zero.

The counter controller 160 may output the count enable signal (CEN) in response to the oscillation signal (NET), the fixing signal (SET) and the enable signal (EN). The counter controller 160 may activate the count enable signal (CEN) on the condition that the fixing signal (SET) is deactivated and the oscillation signal (NET) and the enable signal (EN) are activated.

In addition, the comparator 170 may compare the count signal (CNT) with the test count signal (TM_CNT) to determine the period of the internal clock (INTCNT), and then output the increase signal (UP), the decrease signal (DN), and the fixing signal (SET). In this example, the test count signal (TM_CNT) may indicate the number of count times of an objective internal clock (INTCLK).

If the number of toggling times of the count signal (CNT) is less than a predetermined number of toggling times of the test count signal (TM_CNT), the comparator 170 may determine that the internal clock (INTCLK) is a long period so that it activates the increase signal (UP).

On the other hand, if the number of toggling times of the count signal (CNT) is greater than the predetermined number of toggling times of the test count signal (TM_CNT), the comparator 170, the comparator 170 may determine that the internal clock (INTCLK) is a short period so that it activates the decrease signal (DN).

In addition, if the number of toggling times of the count signal (CNT) is equal to the predetermined number of toggling times of the test count signal (TM_CNT), the comparator 170 may determine that the period of the internal clock (INTCLK) is identical to a target period, such that it activates the fixing signal (SET).

Figure 2:
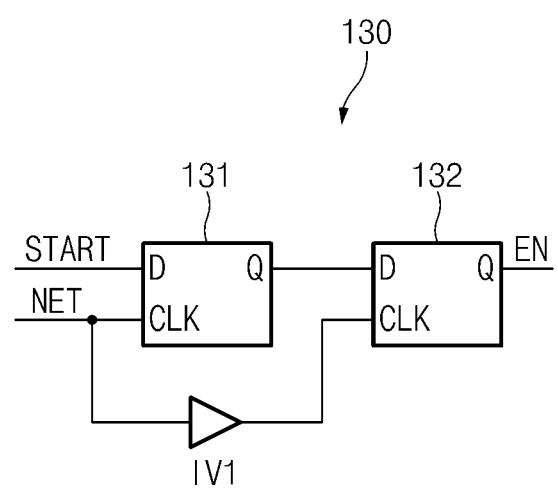
FIG. 2 is a circuit diagram illustrating a representation of an example of an enable controller illustrated in FIG. 1.

FIG. 2 is a circuit diagram illustrating a representation of an example of the enable controller 130 illustrated in FIG. 1.

Referring to FIG. 2, the enable controller 130 may output the enable signal (EN) in response to the start signal (START) when the oscillation signal (NET) is activated.

The enable controller 130 may include a plurality of flip-flops (131, 132) coupled in series to each other. Each flip-flop (131 or 132) may be composed of a D flip-flop. Each flip-flop (131 or 132) may be composed of an edge triggered flip-flop configured to operate in synchronization with the clock edge.

In this example, the flip-flop 131 may output the enable signal (EN) in response to the start signal (START) when the oscillation signal (NET) applied to a clock terminal (CLK) is activated. The flip-flop 132 may receive the oscillation signal (NET) inverted by an inverter (IV1) through the clock terminal (CLK).

Therefore, if the output signal of the inverter (IV1) is activated, the flip-flop 132 may output the enable signal (EN) in response to the output signal of the flip-flop 131. The first flip-flop 131 may be complementary to the second flip-flop 132.

Figure 3:
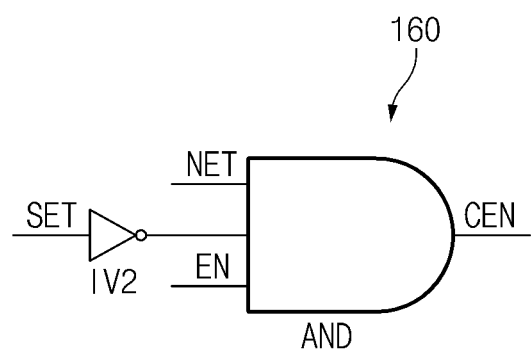
FIG. 3 is a circuit diagram illustrating a representation of an example of a counter controller illustrated in FIG. 1.

FIG. 3 is a circuit diagram illustrating a representation of an example of the counter controller 160 illustrated in FIG. 1.

Referring to FIG. 3, the counter controller 160 may output a count enable signal (CEN) by logically combining the oscillation signal (NET), the fixing signal (SET), and the enable signal (EN).

The counter controller 160 may activate the count enable signal (CEN) when the fixing signal (SET) is deactivated and the oscillation signal (NET) and the enable signal (EN) are activated. On the other hand, if the fixing signal (SET) is activated, the counter controller 160 may deactivate the count enable signal (CEN) irrespective of the oscillation signal (NET) and the enable signal (EN).

The counter controller 160 may include, for example but not limited to, an inverter (IV2) and a logic gate, for example an AND gate (AND). The AND gate (AND) may perform an AND operation among the oscillation signal (NET), the enable signal (EN), and the fixing signal (SET) inverted by the inverter (IV2), and may thus output the count enable signal (CEN).

Figure 4:
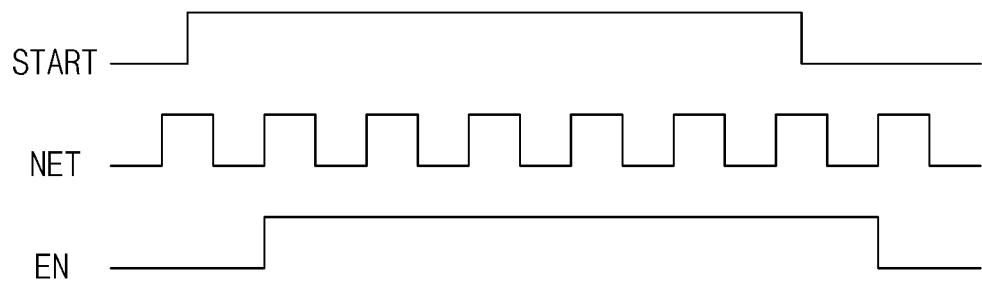
FIG. 4 is a timing diagram illustrating a representation of an example of the operations of an enable controller illustrated in FIG. 2.

FIG. 4 is a timing diagram illustrating a representation of an example of the operations of the enable controller 130 illustrated in FIG. 2.

Referring to FIG. 4, the enable controller 130 may receive the oscillation signal (NET) having the period selected by the selection unit 120. In this example, the start signal (START) is activated to a high level.

The enable controller 130 may output the enable signal (EN) of a high level at a specific time at which the oscillation signal (NET) transitions to a high level after the start signal (START) is first activated to a high level. That is, if the start signal (START) is activated to a high level, the start signal (START) is synchronized with a first rising clock of the oscillation signal (NET), such that the enable signal (EN) transitions to a high level.

The enable controller 130 may output the enable signal (EN) of a low level at a specific time at which the oscillation signal (NET) transitions to a high level after the start signal (START) is first deactivated to a low level. That is, if the start signal (START) is deactivated to a low level, the start signal (START) is synchronized with a first rising clock of the oscillation signal (NET), such that the enable signal (EN) transitions to a low level.

Figure 5:
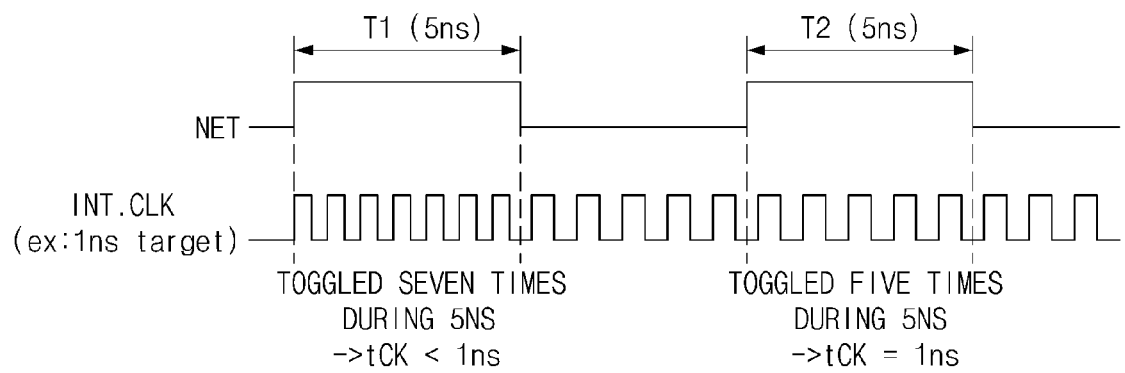
FIG. 5 is a conceptual diagram illustrating a representation of an example of the operations of a clock generation device according to an embodiment.

FIG. 5 is a conceptual diagram illustrating a representation of an example of the operations of the clock generation device 100 according to an embodiment.

Referring to FIG. 5, if the enable signal (EN) is activated, the oscillator 140 may perform tuning of the internal clock (INTCLK) in response to the increase signal (UP), the decrease signal (DN) or the fixing signal (SET) generated during activation of the oscillation signal (NET) in such a manner that the internal clock (INTCLK) is turned to a long period, a short period, or a fixed period according to any one of the signals (UP, DN, SET). As a result, the internal clock (INTCLK) can be tuned to a target period.

For this purpose, the counter 150 may count the number of toggling times of the internal clock (INTCLK) during a high-pulse section of a half-cycle oscillation signal (NET), such that the counter 150 may test whether the internal clock (INTCLK) has been generated according to the target frequency.

For example, it may be assumed that a target frequency of the internal clock (INTCLK) is set to 1 ns. It is assumed that one period or one cycle of the oscillation signal (NET) is set to 10 ns. As a result, it is assumed that a frequency of each section (T1 or T2) in which the half-cycle oscillation signal (NET) is maintained in a high-pulse period is set to 5 ns. Although, the embodiments are not limited in this manner and the target frequencies, and cycles or half-cycles of the oscillation signals may be set differently according to the various embodiments.

That is, the embodiment of FIG. 5 may be applicable to an example of an embodiment in which the internal clock (INTCLK) having the period of 1 ns is generated using the external clock (EXTCLK) having a clock frequency (tCK) of 10 ns.

If an error occurs in the oscillator 140 according to a change in process, voltage, and/or temperature (PVT), the internal clock (INTCLK) is changed. Accordingly, the counter 150 may detect whether the internal clock (INTCLK) is toggled seven times during a predetermined time of 5 ns within the section T1 of the oscillation signal (NET), and may output the count signal (CNT) to the comparator 170.

In this example, the comparator 170 may determine whether the period (tCK) of the internal clock (INTCLK) is less than the target frequency of 1 ns, such that the decrease signal (DN) is activated.

If the decrease signal (DN) is activated, the oscillator 140 may reduce the number of toggling times of the internal clock (INTCLK) within the section T2. In other words, the oscillator 140 may control the internal clock (INTCLK) to be toggled five times within the section T2, such that the oscillator 140 allows the period (tCK) of the internal clock (INTCLK) to be identical to the target frequency of 1 ns.

The comparator 170 may compare the number of toggling times of the internal clock (INTCLK) established by the test count signal (TM_CNT) with the value of the count signal (CNT) generated from the counter 150, and may thus confirm specific information indicating whether the internal clock (INTCLK) has a short period or a long period.

In this example, assuming that the period of the external clock (EXTCLK) received from the external test device is already known and the period of the target internal clock (INTCLK) is also already known, it may be possible to determine how many times the internal clock (INTCLK) is to be toggled during a half cycle of the oscillation signal (EN). Information about the number of toggling times of the internal clock (INTCLK) may be established by the test count signal (TM_CNT) being set to a reference value of the comparator 170.

On the other hand, it is assumed that the internal clock (INTCLK) is toggled three times during the half cycle of the oscillation signal (NET). In this example, the counter 150 may detect that the period (tCK) of the internal clock (INTCLK) is longer than the target period of 1 ns, and may output the count signal (CNT) to the comparator 170 indicating the detected result. In this example, the comparator 170 may determine that the period (tCK) of the internal clock (INTCLK) is longer than the target period of 1 ns, and may activate the increase signal (UP).

If the increase signal (UP) is activated, the oscillator 140 may increase the number of toggling times of the internal clock (INTCLK). That is, the oscillator 140 may control the internal clock (INTCLK) to be toggled five times during the half cycle of the oscillation signal (NET), such that the period (tCK) of the internal clock (INTCLK) is adjusted to be identical to the target period of 1 ns.

In addition, after the internal clock (INTCLK) is toggled five times, if the number of the count signals (CNT) is identical to the predetermined test count signal (TM_CNT), it is determined that the period of the internal clock (INTCLK) is tuned to the target period, such that the fixing signal (SET) is activated.

The oscillator 140 may determine the number of toggling times of the count signal (CNT) during the section T1 of the oscillation signal (NET), and may tune the period of the internal clock (INTCLK) during the next section T2 in which the clock of the oscillation signal (NET) is at a high level.

In accordance with an embodiment, although the external clock (EXTCLK) is input at a low speed (or is input during a long period), the internal clock (INTCLK) is tuned to a target level using the clock generation device 100, such that the semiconductor device can be correctly tested.

Figure 6:
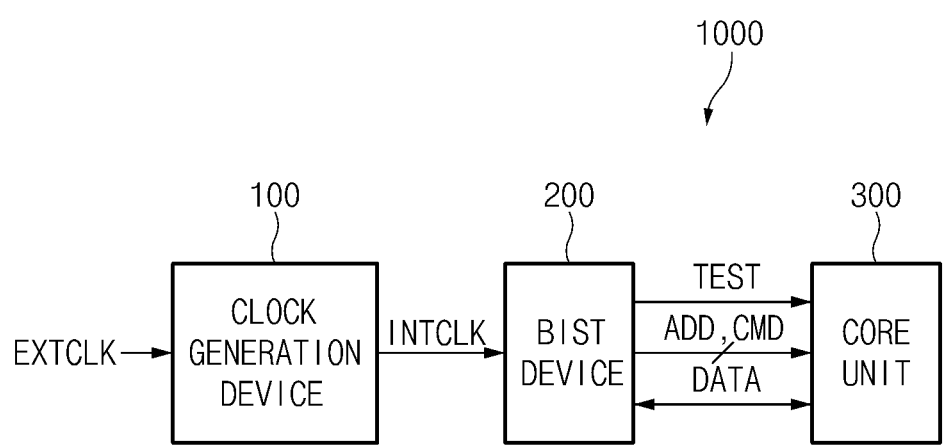
FIG. 6 is a block diagram illustrating a representation of an example of a semiconductor device including the clock generation device according to an embodiment.

FIG. 6 is a block diagram illustrating a representation of an example of a semiconductor device 1000 including the clock generation device 100 according to an embodiment.

Typically, semiconductor memory devices have been tested by an external dedicated device. However, with the technical development of System On Chip (SoC) in which a system is implemented as one chip, the scheme for testing the semiconductor memory device has been greatly changed.

The SoC is designed to use a plurality of embedded memories, each of which has a large range of data I/O (Input/Output), to improve system performance or throughput. The method for testing the embedded memory device using the legacy dedicated test device is far from efficient due to an insufficient number of channels of the test device, limitation in high-speed testing, and low probability of accessing the embedded memory.

If the external test device has a low frequency when the semiconductor memory device is tested, a long period of time is consumed to test the semiconductor device. As a countermeasure against the longer testing time, a scheme for including the Built-In Self Test (BIST) device 200 into the SoC has been proposed. Since the proposed scheme is advantageous in terms of high-speed testing or the like, many developers and companies are conducting intensive research into the above-mentioned scheme, such that the above-mentioned scheme has been widely used to test the embedded memory of the SoC.

The semiconductor device 1000 according to the embodiment may include the clock generation device 100 illustrated in FIGS. 1 to 5, the BIST device 200, and a core unit 300.

In this example, the clock generation device 100 performs tuning of the internal clock (INTCLK) in response to the external clock (EXTCLK), adjusts the tuned internal clock (INTCLK) to have a desired frequency, and outputs the adjusted result to the BIST device 200.

That is, since the external clock (EXTCLK) has a lower frequency than the internal clock (INTCLK), the count result indicating how many times the internal clock (INTCLK) is toggled in the half-cycle external clock (EXTCLK) is acquired to test whether the internal clock is generated according to the target frequency.

The BIST device 200 may receive the internal clock (INTCLK), and may test the core unit 300 in response to the test signal (TEST), the address (ADD), the command signal (CMD), and data (DATA).

In this example, the test signal (TEST) may be used when the BIST device 200 tests the core unit 300. The command signal (CMD) acting as an operation command signal for actually driving the core unit 300 may include an active signal (Active), a read signal (Read), a write signal (Write), a refresh signal (refresh), a precharge signal (Precharge), etc.

The BIST device 200 may receive the internal clock (INTCLK) from the clock generation device 100, may buffer the received internal clock (INTCLK), and may sequentially store external command signals. During the test operation, the internal command signal (CMD) and the address (ADD) stored in response to the internal clock (INTCLK) and the output enable signal may be sequentially output to the core unit 300.

Therefore, during the read operation, data (DATA) of the core unit 300 may be read, and data (DATA) may be written in the core unit 300, such that the test operation is carried out. The BIST device 200 may test a memory cell array of the core unit 300 using various test patterns.

The core unit 300 may include a plurality of memory cells (not illustrated) arranged in rows and columns. Data received through one bit line and one word line may be stored in each memory cell of the core unit 300.

The core unit 300 may include a core region and a peripheral region.

In this example, the core region may include memory cell arrays, a row decoder, and a column decoder. The core region may be selectively controlled according to any one of a normal operation mode and a test operation mode, upon receiving the test signal (TEST) from the BIST device 200.

The peripheral region may include an input/output (I/O) interface, a test controller, a multiplexer (MUX), etc. The multiplexer (MUX) may multiplex the address (ADD), the data signal (DATA), and the command signal (CMD) in response to an internal test mode, an external test mode, and a normal mode. The I/O interface may include an address buffer for buffering the address (ADD) entered through I/O pads, a data output buffer, and a control logic for decoding control signals or the like.

Each memory cell of the core unit 300 is implemented as an integrated circuit (IC) storing data therein. For example, the memory cell may include DRAM, FLASH, PCRAM, etc. All kinds of memory cells may store data therein upon receiving a control signal from the memory controller, and may output the stored data.

The semiconductor device 1000 according to the embodiment may be configured to store data therein. The semiconductor device 1000 may be implemented in various ways. However, the scope or spirit of the semiconductor device 1000 is not limited thereto, and the semiconductor device 1000 may be a dynamic random access memory (DRAM) such as DDR SDRAM (Double Data Rate Synchronous Dynamic Random Access Memory), LPDDR (Low Power Double Data Rate) SDRAM, GDDR (Graphics Double Data Rate) SDRAM, or RDRAM (Rambus Dynamic Random Access Memory).

The memory cell array of the core unit 300 may include a plurality of memory cells. In accordance with the embodiment, the memory cells may be volatile memory cells. For example, each memory cell may be a volatile memory cell comprised of a single access transistor and a single storage capacitor. Alternatively, each memory cell may be a gain cell including a plurality of transistors. However, the scope or spirit of constituent elements of memory cells illustrated in the embodiment is not limited to the above-mentioned examples.

As is apparent from the above description, the clock generation device and the semiconductor device including the same can properly tune a frequency of the internal clock to a target frequency, such that the test operation can be correctly carried out.

Those skilled in the art will appreciate that the embodiments may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments consistent with the present disclosure have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A clock generation device comprising:
   an oscillator configured to tune an oscillation signal in response to a tuning signal, and adjust a period of an internal clock;
   a counter configured to count the internal clock in response to a count enable signal, and output a count signal;
   a comparator configured to compare the count signal with a test count signal including a target count number of the internal clock, and output the tuning signal; and
   an enable controller configured to output an enable signal in response to a start signal when the oscillation signal is activated,
   wherein the oscillator is configured to tune the oscillation signal in response to the tuning signal when the enable signal is activated.

2. The clock generation device according to claim 1, wherein the tuning signal includes an increase signal for increasing a period of the internal clock, a decrease signal for reducing the period of the internal clock, and a fixing signal for fixing the period of the internal clock.

3. The clock generation device according to claim 1, further comprising:
   a divider configured to divide an external clock into a plurality of division clock signals, and output the plurality of division clock signals; and
   a selection unit configured to select the external clock or any one of the division clock signals and output the oscillation signal indicating the selected result.

4. The clock generation device according to claim 1, wherein the enable controller includes a plurality of D flip-flops.

5. The clock generation device according to claim 1, wherein the enable controller includes:
   an edge triggered flip-flop configured to operate in synchronization with a clock edge of the oscillation signal.

6. The clock generation device according to claim 1, wherein the enable controller includes:
   a first flip-flop configured to flip-flop the start signal in synchronization with a clock of the oscillation signal; and
   a second flip-flop configured to flip-flop an output signal of the first flip-flop in synchronization with an inversion clock of the oscillation signal.

7. The clock generation device according to claim 1, wherein:
   the enable controller, after the start signal is activated to a high level, is configured to activate the enable signal to a high level in synchronization with a first rising clock of the oscillation signal; and
   the enable controller, if the start signal is deactivated to a low level, is configured to deactivate the enable signal to a low level in synchronization with a first rising clock of the oscillation signal.

8. The clock generation device according to claim 1, further comprising:
   a counter controller configured to output the count enable signal for activating the counter in response to the oscillation signal, a fixing signal, and an enable signal,
   wherein the oscillator is configured to tune the oscillation signal in response to the tuning signal when the enable signal is activated.

9. The clock generation device according to claim 8, wherein:
   the counter controller, if the fixing signal is deactivated and the oscillation signal and the enable signal are activated, is configured to activate the count enable signal; and
   the counter controller, if the fixing signal is activated, is configured to deactivate the count enable signal, irrespective of the oscillation signal and the enable signal.

10. The clock generation device according to claim 8, wherein the counter controller includes:
    a logic gate configured to perform an AND operation among the oscillation signal, an inversion signal of the fixing signal, and the enable signal, and output the count enable signal.

11. The clock generation device according to claim 1, wherein:
    the oscillator increases the number of toggling times of the internal clock when an increase signal from among the tuning signals is activated, decreases the number of toggling times of the internal clock when a decrease signal from among the tuning signals is activated, and fixes a period of the internal clock when a fixing signal from among the tuning signals is activated.

12. The clock generation device according to claim 1, wherein:
the comparator, if the number of toggling times of the count signal is less than a predetermined number of toggling times of the test count signal, is configured to activate an increase signal for increasing a period of the internal clock; and
the comparator, if the number of toggling times of the count signal is higher than the predetermined number of toggling times of the test count signal, is configured to activate a decrease signal for reducing the period of the internal clock.

13. The clock generation device according to claim 1, wherein:
the comparator, if the number of toggling times of the count signal is identical to the predetermined number of toggling times of the test count signal, is configured to activate a fixing signal for fixing a period of the internal clock.

14. The clock generation device according to claim 1, wherein the counter is configured to count how many times the internal clock is toggled during a half-cycle high pulse section of the oscillation signal.

15. A semiconductor device comprising:
a clock generation device configured to generate an internal clock upon receiving an external clock, and adjust a period of the internal clock in response to a tuning signal;
a Built-In Self Test (BIST) unit configured to output a test signal in response to the internal clock; and
a core unit in which a test operation of internal data is performed in response to the test signal.

16. The semiconductor device according to claim 15, wherein the clock generation device includes:
an oscillator configured to tune an oscillation signal in response to the tuning signal, and adjust a period of the internal clock;
a counter configured to count the internal clock in response to a count enable signal, and output a count signal; and
a comparator configured to compare the count signal with a test count signal including a target count number of the internal clock, and output the tuning signal.

17. The semiconductor device according to claim 16, wherein the clock generation device includes:
a divider configured to divide the external clock into a plurality of division clock signals, and output the plurality of division clock signals; and
a selection unit configured to select the external clock or any one of the division clock signals and output the oscillation signal indicating the selected result.

18. The semiconductor device according to claim 16, wherein the clock generation device further includes:
an enable controller configured to output an enable signal in response to a start signal when the oscillation signal is activated,
wherein the oscillator is configured to tune the oscillation signal in response to the tuning signal when the enable signal is activated.

19. The semiconductor device according to claim 16, wherein the clock generation device further includes:
a counter controller configured to output the count enable signal for activating the counter in response to the oscillation signal, a fixing signal, and an enable signal,
wherein the oscillator is configured to tune the oscillation signal in response to the tuning signal when the enable signal is activated.

20. A clock generation device comprising:
an oscillator configured to tune an external clock signal in response to a tuning signal, and adjust a period of an internal clock signal based on the tuning signal;
a comparator configured to compare the period of the internal clock with a target period to determine the period of the internal clock, and output the tuning signal to the oscillator; and
a counter configured to count a number of toggling times of the internal clock, and output a count signal indicating a count result,
wherein the comparator compares the count result with a target count number for comparing the period of the internal clock with the target period to determine the period of the internal clock.

21. The clock generation device according to claim 20, further comprising:
a divider configured to divide an external clock into a plurality of division clock signals, and output the plurality of division clock signals; and
a selection unit configured to select the external clock or any one of the division clock signals and output an oscillation signal indicating the selected result,
wherein the oscillator is configured to tune the oscillation signal generated from the external clock signal in response to the tuning signal.

22. The clock generation device according to claim 20, wherein, if the number of toggling times of the count signal is less than the target count number, then the oscillator increases a period of the internal clock,
wherein, if the number of toggling times of the count signal is greater than the target count number, then the oscillator reduces a period of the internal clock, and
wherein, if the number of toggling times of the count signal is equal to the target count number, then the oscillator fixes the period of the internal clock.

23. The clock generation device according to claim 22, wherein the tuning signal includes an increase signal for increasing a period of the internal clock, a decrease signal for reducing the period of the internal clock, and a fixing signal for fixing the period of the internal clock.

24. The clock generation device according to claim 21, further comprising:
a counter controller configured to activate the counter in response to the oscillation signal, a fixing signal, and an enable signal,
wherein the oscillator is configured to tune the oscillation signal in response to the tuning signal when the enable signal is activated.

25. The clock generation device according to claim 24, further comprising:
an enable controller configured to output the enable signal in response to a start signal when the oscillation signal is activated.

26. A clock generation device comprising:
an oscillator configured to tune an external clock signal in response to a tuning signal, and adjust a period of an internal clock signal based on the tuning signal;
a counter configured to count the internal clock, and output a count result;
a comparator configured to compare the count result with a target count number to determine the period of the internal clock, and output the tuning signal to the oscillator; and an enable controller configured to output an enable signal in response to a start signal when the oscillation signal is activated, wherein the oscillator is configured to tune the oscillation signal in response to the tuning signal when the enable signal is activated.

* * * * *